(12) United States Patent
Allison (10) Patent No.: US 8,544,213 B2
(45) Date of Patent: Oct. 1, 2013

(54) TRANSFORMING STRUCTURE WITH TOWER SHUTTLE

(75) Inventor: Todd N. Allison, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 16 days.

(21) Appl. No.: 13/279,929

(22) Filed: Oct. 24, 2011

(65) Prior Publication Data

US 2012/0096775 A1   Apr. 26, 2012

Related U.S. Application Data

(60) Provisional application No. 61/406,005, filed on Oct. 22, 2010.

(51) Int. Cl.
*E04H 3/26* (2006.01)

(52) U.S. Cl.
USPC ....... 52/7; 52/69; 52/79.5; 52/143; 296/26.06

(58) Field of Classification Search
USPC .............. 52/7, 64, 66, 69, 79.5, 143, 745.14, 52/68, 79.1; 296/26.06, 26.07
See application file for complete search history.

(56) References Cited

U.S. PATENT DOCUMENTS

| | | | | |
|---|---|---|---|---|
| 2,052,757 A * | 9/1936 | Fitch | ................................ | 52/69 |
| 2,143,235 A * | 1/1939 | Bassett | ........................... | 472/75 |
| 2,857,993 A * | 10/1958 | Terrell | ............................ | 52/120 |
| 3,002,557 A * | 10/1961 | Roth et al. | ..................... | 160/351 |
| 3,044,540 A * | 7/1962 | Hammersley | ................... | 160/20 |
| 3,258,884 A * | 7/1966 | Wenger | ............................... | 52/6 |
| 3,417,518 A * | 12/1968 | Jaffe | ................................... | 52/7 |
| 3,433,500 A * | 3/1969 | Christensen | ................. | 280/79.2 |
| 3,527,470 A * | 9/1970 | Ord | .............................. | 280/79.2 |
| 3,547,459 A * | 12/1970 | Lapham | ....................... | 280/79.2 |
| 3,620,564 A * | 11/1971 | Wenger et al. | ................... | 296/83 |
| 3,633,324 A * | 1/1972 | Cuylits | ............................. | 52/66 |
| 3,908,787 A * | 9/1975 | Wenger et al. | ................... | 181/30 |
| 3,984,949 A * | 10/1976 | Wahlquist | ......................... | 52/70 |
| 3,985,254 A * | 10/1976 | Grandury | ....................... | 414/498 |
| 4,026,076 A * | 5/1977 | Analetto | ............................. | 52/6 |
| 4,232,488 A * | 11/1980 | Hanley | ................................ | 52/7 |
| 4,464,868 A * | 8/1984 | Howroyd | ........................... | 52/69 |
| 4,535,933 A * | 8/1985 | Kuiper | ....................... | 237/12.3 A |
| 4,869,030 A * | 9/1989 | Clark | ............................. | 52/79.6 |
| 4,883,306 A * | 11/1989 | Stucky | ........................... | 296/162 |
| 4,917,217 A * | 4/1990 | Rogers et al. | ................. | 182/152 |
| 4,934,113 A * | 6/1990 | Hall et al. | ........................... | 52/7 |
| 4,949,649 A * | 8/1990 | Terres et al. | ................... | 108/116 |
| 5,078,442 A * | 1/1992 | Rau et al. | ................... | 296/26.02 |
| 5,094,285 A * | 3/1992 | Murray | ........................... | 160/67 |
| 5,115,608 A * | 5/1992 | Abraham et al. | ............. | 52/238.1 |

(Continued)

*Primary Examiner* — William Gilbert
*Assistant Examiner* — James Ference
(74) *Attorney, Agent, or Firm* — Law Office of Mark Brown, LLC; Mark Brown; Christopher M. DeBacker (57) ABSTRACT

A transportable, transformable structure utilizing a tower shuttle apparatus for converting the structure from a closed, transportable unit to an open, stationary unit. The tower shuttle includes a connection post, including a socket joint, connected to a shuttle cart on casters. The socket joint is capable of receiving a ball connection at the base of a structural tower affixed to the transformable structure. This connection allows a single operator to fully assemble a mobile performance stage or other transportable, transformable structure with ease and with no damage to the stage deck. The tower shuttle allows the towers to be moved into position no matter the required direction.

7 Claims, 6 Drawing Sheets

(56) References Cited

U.S. PATENT DOCUMENTS

| | | | |
|---|---|---|---|
| 5,152,109 A * | 10/1992 | Boers | 52/143 |
| RE34,468 E * | 12/1993 | Rau et al. | 296/26.02 |
| 5,327,698 A * | 7/1994 | Uhl | 52/68 |
| 5,375,899 A * | 12/1994 | Wright | 296/21 |
| 5,398,463 A * | 3/1995 | Wright | 52/7 |
| 5,400,551 A * | 3/1995 | Uhl | 52/68 |
| 5,417,468 A * | 5/1995 | Baumgartner et al. | 296/162 |
| 5,454,441 A * | 10/1995 | Jines | 180/125 |
| 5,524,691 A * | 6/1996 | Jines | 160/135 |
| 5,546,709 A * | 8/1996 | Decker et al. | 52/66 |
| 5,622,011 A * | 4/1997 | Jines | 52/66 |
| 5,651,405 A * | 7/1997 | Boeddeker et al. | 160/135 |
| 5,706,616 A * | 1/1998 | Fernandez | 52/143 |
| 5,716,090 A * | 2/1998 | Chang et al. | 296/26.01 |
| 5,761,854 A * | 6/1998 | Johnson et al. | 52/69 |
| 5,875,591 A * | 3/1999 | Jines | 52/66 |
| 5,924,465 A * | 7/1999 | Malott | 160/67 |
| 5,947,502 A * | 9/1999 | Kammerzell et al. | 280/442 |
| 6,085,861 A * | 7/2000 | Jines | 181/30 |
| 6,393,769 B1* | 5/2002 | Mertik et al. | 52/7 |
| 6,407,798 B2* | 6/2002 | Graves et al. | 352/69 |
| 6,434,895 B1* | 8/2002 | Hosterman et al. | 52/143 |
| 6,499,258 B1* | 12/2002 | Borglum | 52/9 |
| 6,997,495 B1* | 2/2006 | Groezinger | 296/26.15 |
| 7,213,869 B1* | 5/2007 | McClellan | 296/161 |
| 7,500,285 B2* | 3/2009 | Willis | 16/19 |
| 7,506,405 B2* | 3/2009 | Willis | 16/47 |
| 2002/0062605 A1* | 5/2002 | Matthews | 52/143 |
| 2004/0108750 A1* | 6/2004 | Park | 296/156 |
| 2008/0236055 A1* | 10/2008 | Laprise | 52/64 |
| 2009/0126281 A1* | 5/2009 | Santini | 52/7 |
| 2010/0024314 A1* | 2/2010 | Pope | 52/67 |

* cited by examiner

FIG. 8

TRANSFORMING STRUCTURE WITH TOWER SHUTTLE

CROSS-REFERENCE TO RELATED APPLICATION

This application claims priority in U.S. Provisional Application No. 61/406,005, filed Oct. 22, 2010, and is incorporated herein by reference.

BACKGROUND OF THE INVENTION

1. Field of the Invention

The present disclosed technology relates generally to an apparatus for raising and aligning the structural towers of a collapsible performance stage, and more specifically to a rolling shuttle which receives the ends of the structural towers of a collapsible performance stage and facilitates positioning the towers in their upright positions supporting a roof over the stage.

2. Description of the Related Art

Mobile performance stages are commonly used for temporary venues, performances, or rallies. Typical mobile performance stages must be assembled on site. Modern mobile stages may come in the form of a trailer, wherein the mobile stage is collapsible to a compact and mobile unit. The APEX 3224 Mobile Stage, manufactured by APEX Stages of Pittsburg, Kans., is an example of such a mobile stage.

Mobile stages generally include a stage deck and can include a stage roof. In order to support the stage roof, columns or towers are often used as structural elements. A mobile stage can be a large structure, and its components are manufactured from steel or other structural, heavy metals. In a typical stage setup situation it may take four laborers to raise the stage roof from the stage deck. In doing so, the laborers may have to drag the base of the stage towers across the stage deck, which may damage the deck or the tower itself. Because these stages are typically rented out for limited use, resiliency and long-term reliability are important features.

Mobile stages are often an economical alternative to erecting a permanent stage at a site. The typical reasons for electing to use a mobile stage include temporary use, cost, and reliability. Cutting the costs of using a mobile stage provides additional incentive for using a mobile stage. The simplest way to cut costs would be to reduce the number of persons required to setup and operate the stage. Costs are also saved when the owner of a mobile stage knows the stage will last. These cost savings can be passed on to customers, increasing the incentive to use one mobile stage over another.

What is needed is a system of erecting a mobile stage featuring minimal labor, minimal time, and minimal wear on the mobile components. Heretofore there has not been a mobile stage tower-erecting apparatus with the capabilities of the invention presented herein.

SUMMARY OF THE INVENTION

The preferred embodiment of the present invention includes a connection post, including a socket joint, connected to a shuttle cart on casters. The socket joint is capable of receiving a ball connection at the base of a structural tower. This connection allows a single operator to fully assemble a mobile performance stage with ease and with no damage to the stage deck. The tower shuttle allows the towers to be moved into position no matter the required direction.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, base, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning.

A preferred embodiment of the present invention relies on the construction of a tower shuttle 17 using a connection post 1 mounted onto a shuttle cart 2. The shuttle 17 is used in conjunction with a mobile stage 19 for erection and deconstruction of the stage.

II. Tower Shuttle 17

Referring to the drawings in more detail, reference numeral 17 generally refers to a tower shuttle. FIGS. 1-5 demonstrate the assembly of the tower shuttle 17. The shuttle 17 is comprised of a connection post 1 and a shuttle cart 2. The connection post 1 may be manufactured from a section of plastic pipe or plastic rod. Ideally, the material must hold a significant amount of weight and be nearly wear-resistant. The preferred embodiment comprises a connection post 1 formed from a plastic rod coated in ceramic, such as the Ceram-Back® line of products manufactured by Progressive Products Inc. of Pittsburg, Kans.

Figure 1:
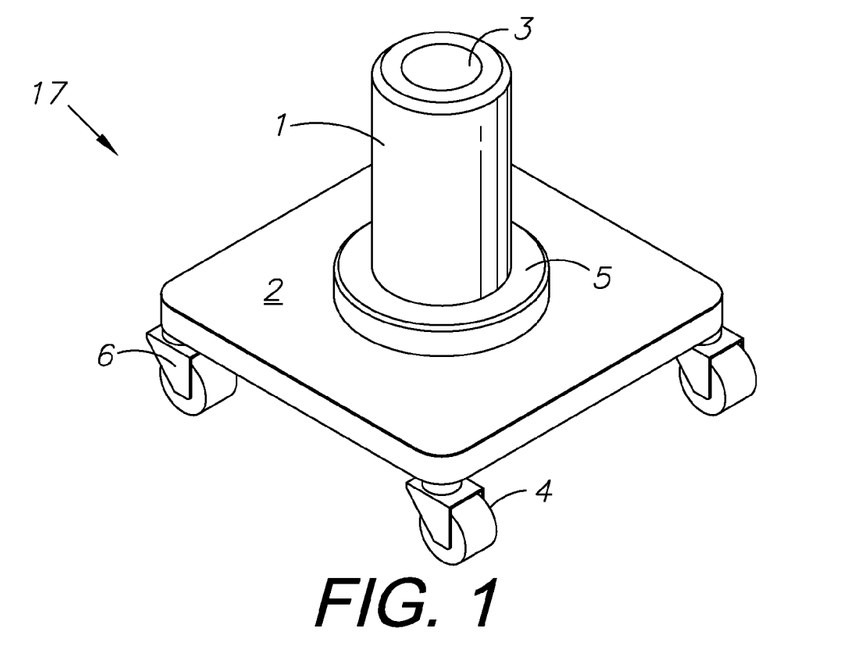
FIG. 1 is an isometric view of a tower shuttle embodying an aspect of the present invention.
Figure 2:
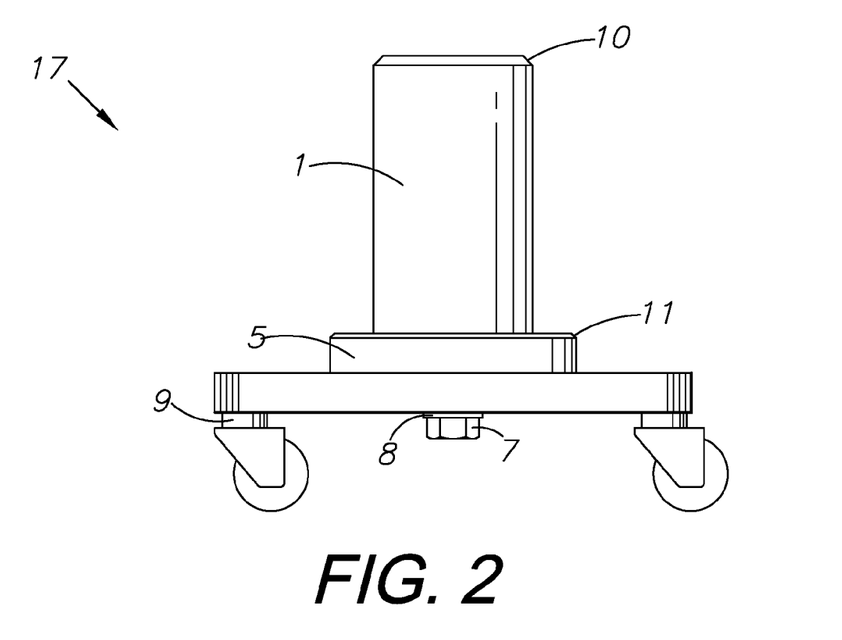
FIG. 2 is an elevation view thereof.
Figure 4:
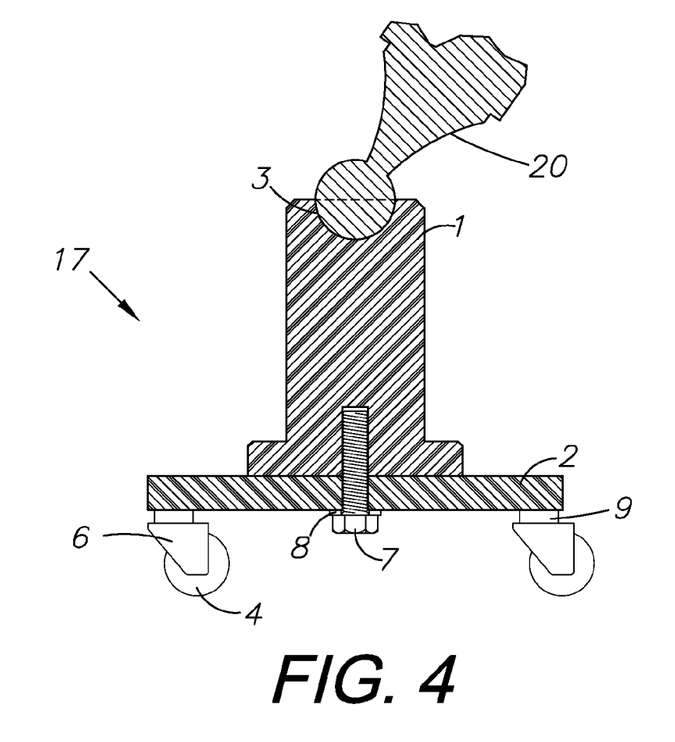
FIG. 4 is a sectional view thereof taken generally along line 4-4 in FIG. 3 and showing a ball-and-socket interconnection.
Figure 5:
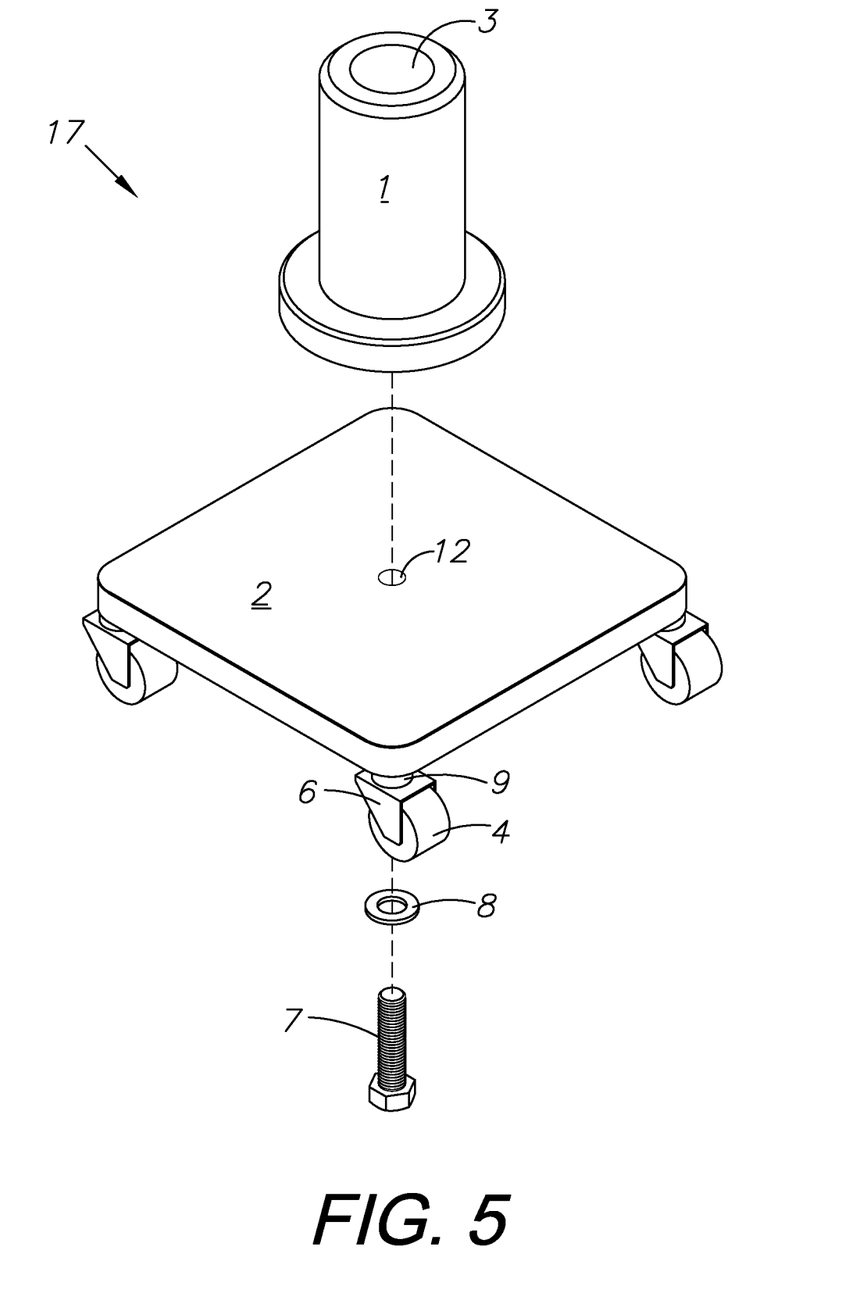
FIG. 5 is an exploded, isometric view thereof.

In the preferred embodiment, the shuttle cart 2 is a square plastic cart including four plastic casters 4 attached to the cart 2 with plastic caster brackets 6. As shown in FIGS. 2, 4, and 5, the casters 4 are located on a ball bearing wheel base 9, which allows the casters 4 to freely rotate 360°, permitting the cart 2 to travel in any desired direction. The connection post 1 is attached to the cart 2 using a securing bolt 7 and washer 8.

Figure 3:
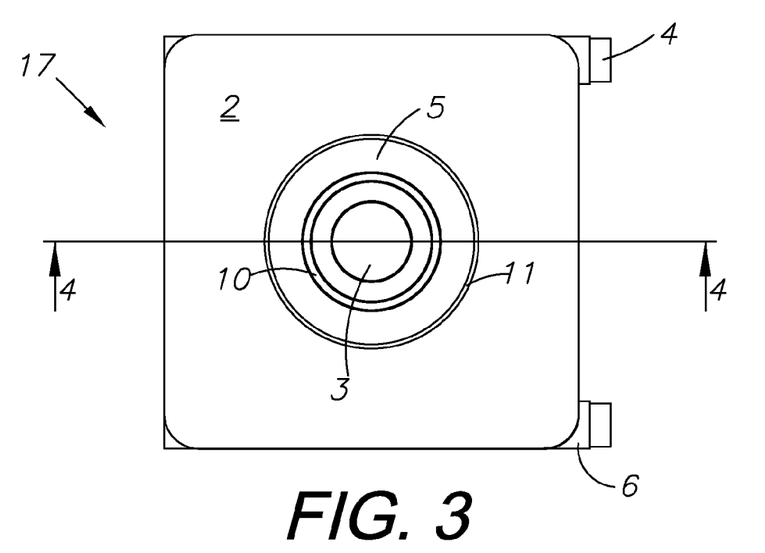
FIG. 3 is a top plan view thereof.

FIG. 3 demonstrates the tower shuttle 17 in further detail. The connection post 1 includes a base 5 which may be of a larger diameter than the main body of the post 1. The base 5 physically contacts the shuttle 2 to disburse the force of a supported tower downward, and includes a chamfered bottom edge 11. The connection post 1 further includes a chamfered top face 10 and houses a socket joint 3 at the apex of the post 1. The socket joint 3 is adapted for receiving a ball joint connected to an appropriate tower.

FIG. 4 is a sectional view of the tower shuttle 17 showing how the socket joint 3 accepts the ball joint 20 of a stage tower 18 or other structural element. The connection forms a ball-and-socket joint that allows the tower 18 to raise no matter which direction the shuttle 17 is pushed.

FIG. 5 shows the complete assembly of the tower shuttle 17 in an exploded view. The bolt 7 threads through the washer 8, the bolt-hole 12 located in the shuttle cart 2, and into the connection post 1. This forms a rigid connection between the post 1 and the cart 2.

III. Mobile Stage 19

Figure 6:
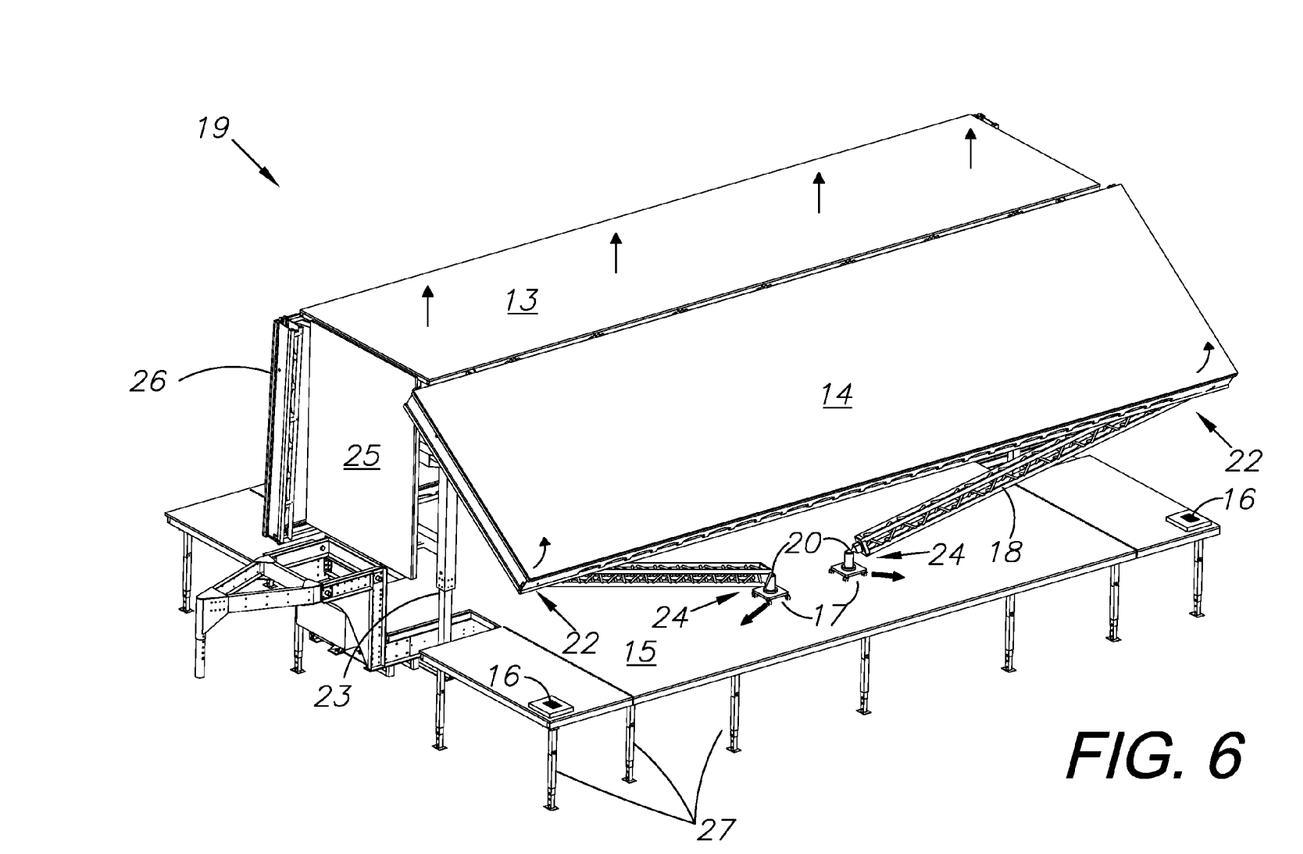
FIG. 6 is an isometric view of an initial step of erecting a mobile stage assembly comprising an aspect of the present invention.
Figure 7:
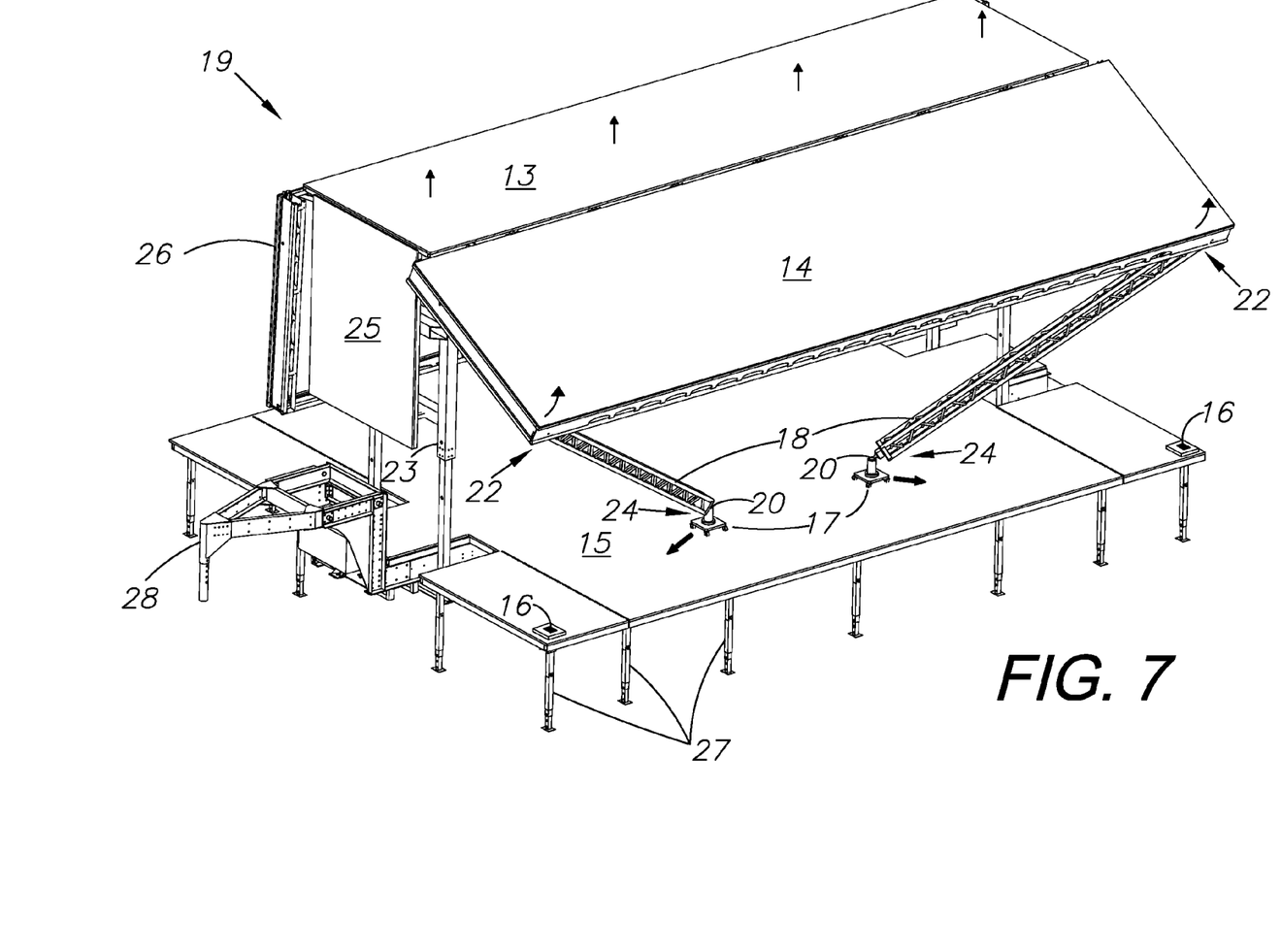
FIG. 7 is an isometric view of an intermediate step of erecting the mobile stage assembly.
Figure 8:
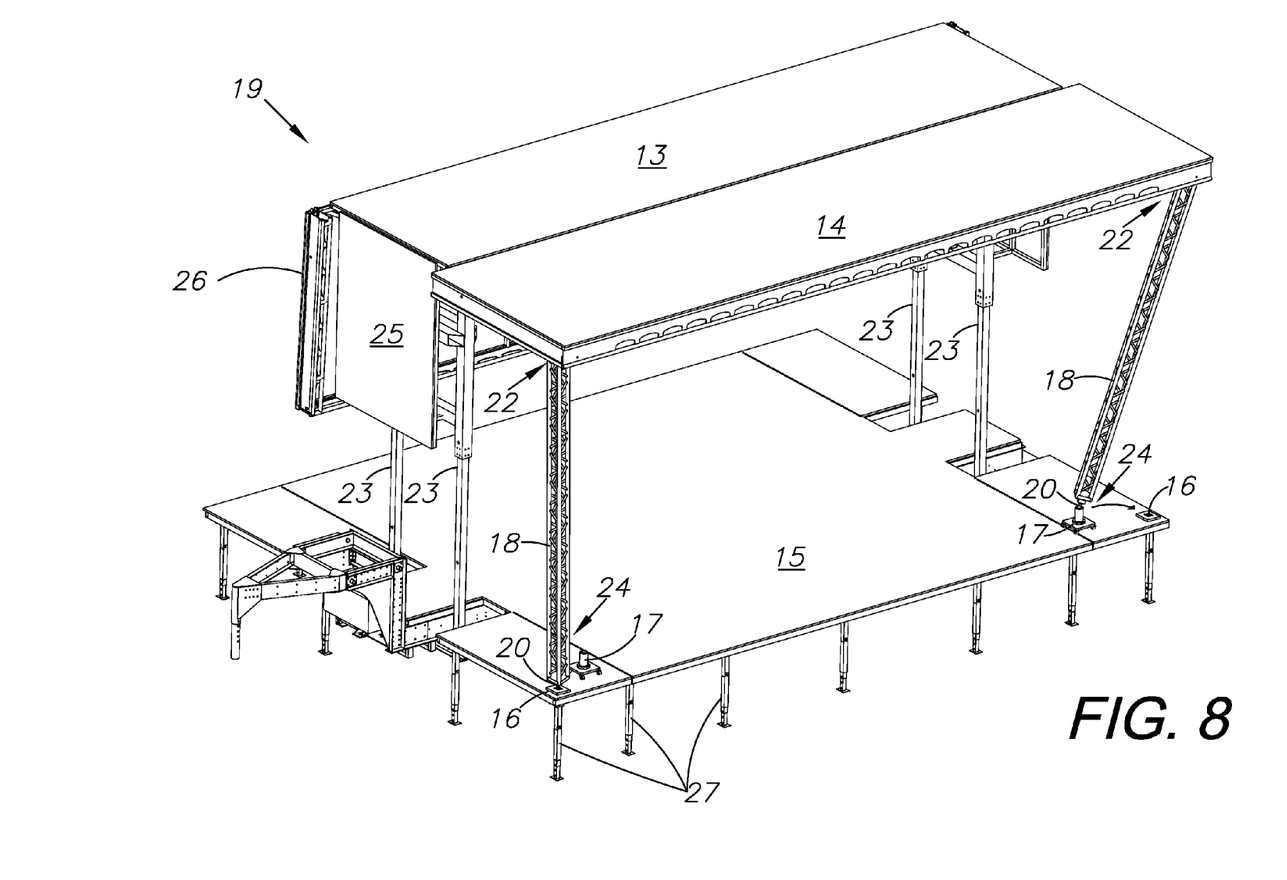
FIG. 8 is an isometric view of a final step of erecting the mobile stage assembly.

As shown in FIGS. 6-8, in an embodiment of the present invention a mobile stage 19 is hauled to a performance site and is erected thereon. In the preferred embodiment, the mobile stage 19 will transform from a trailer hauled by a truck or other vehicle into a fully functional temporary performance stage.

The mobile stage 19 includes a roof section 13, roof wing 14, side walls 25, a rear wall 26, a stage deck 15 suspended upon a number of retractable stage jacks 27, and at least two towers 18. As shown in the progression demonstrated by FIGS. 6-8, the roof wing 14 includes two attached towers 18. As the towers 18 are moved from a starting, folded position in FIG. 6 to a final, standing position in FIG. 8, the roof wing 14 fully extends over the stage deck 15. This forms a complete stage with a roof covering for protecting performers and allowing lights and other equipment to be mounted above the performers.

The roof section 13 is also held suspended above the stage deck 15 via expanding pillars 23. The pillars may expand using hydraulics, or other mechanical means; or they may expand as the towers 18 are moved into place. Once the roof section 13 is at an apex, and the towers 18 are in a final position, the expanding pillars 23 lock to maintain a final roof height.

Side walls 25 and a rear wall 26 are affixed to the roof section 13. As the roof section 13 raises, the side walls 25 and rear wall 26 are also raised. These walls act to enclose the performance space of the mobile stage 19.

Each tower 18 includes proximal and distal ends 22, 24. The proximal end is attached to the roof wing 14 via a hinged connection. The distal end 24 includes a ball joint 20 capable of being seated into the socket joint 3 of the tower shuttle 17. Once the tower ball joint 20 is connected to the tower shuttle 17, the shuttle aids in moving the tower 18 from a folded position as shown in FIG. 6 to a standing position as shown in FIG. 8.

Upon the towers 18 and tower shuttles 17 reaching their final positions as indicated in FIG. 8, the tower 18 is disconnected from the tower shuttle 17, and the tower ball joint 20 is attached to a socket joint 16 affixed to the stage deck 15. This secures the tower 18 in a final standing position that will ensure the stage 19 remains structurally supported during the duration of the performance.

Once the performance has been completed, the mobile stage 19 must be deconstructed and returned to its mobile form. The tower 18 is disconnected from the stage mounted socket joint 16 and reseated into the tower shuttle 17. The shuttle 17 will guide the towers 18 from the standing position indicated in FIG. 8 back to a folded position indicated in FIG. 6. The roof section 13 and stage deck 15 may then be folded up and the mobile stage 19 transported to a new location. A standard trailer hitch 28 is affixed to the mobile stage 19 at an end, and allows the stage to be hauled by a standard truck or transport tractor. A number of wheels, not shown, may be affixed to the mobile stage 19 to accommodate transportation of the stage.

Because the mobile stage 19 may include hydraulic power for moving the towers into place, the person operating the stage simply ensures that the tower ball joints 20 are firmly seated into the shuttle socket joints 3, and then activates the stage's hydraulics. The towers will move into position, where the operator can then transfer the tower 18 from the shuttle socket 3 to the stage mounted socket 16. This allows a single operator to setup and deconstruct the entire mobile stage 19 without additional labor.

It will be appreciated that tower shuttle 17 can be used for various other applications. For example, the transforming structural element does not need to be a mobile performance stage 19. The structural element could be a store-front which transforms from a closed position to an open position by erecting towers to support said store front. Moreover, the tower shuttle 17 can be compiled of additional elements or alternative elements to those mentioned herein, while returning similar results.

It is to be understood that while certain aspects of the disclosed subject matter have been shown and described, the disclosed subject matter is not limited thereto and encompasses various other embodiments and aspects.

Having this described the invention, what is claimed as new and desired to be secured by Letters Patent is:

1. A transportable, transforming structure comprising:
   a flat stage including a stage surface being mounted upon a plurality of retractable stage jacks, said jacks capable of retracting to allow the structure to be transportable;
   a stage enclosure comprising a roof including an inner face and an outer face, side walls, and a rear wall, said stage enclosure being capable of being repositioned from a lowered position to a raised position;
   a roof wing including an inner face and an outer face, said roof wing being connected to said roof such that the roof wing may be rotated at least 90 degrees from a lowered position perpendicular to said roof, to a raised position parallel with said roof;
   a plurality of expanding pillars each including a proximal end and a distal end, said stage enclosure being mounted upon the proximal ends of each of said expanding pillars;
   at least two towers comprising a generally elongated structure including a proximal end and a distal end, said tower proximal ends being hingedly connected to said roof wing inner face and each of said at least two tower distal ends comprising a connection joint;
   at least two tower shuttles, each comprising a platform mounted upon a plurality of casters, and a connection post mounted upon said tower shuttle platform, said connection post configured to receive said tower distal end connection joint;
   at least two shuttle sockets mounted upon said stage surface, said shuttle sockets adapted for receiving and immobilizing said at least two tower shuttles;

wherein said transforming structure is capable of being transported to a desired location, and said flat stage is elevated via said retractable stage jacks;

wherein said at least two towers are joined to said at least two tower shuttles via said tower connection joints and said shuttle connection posts;

wherein said shuttles are rolled across said flat stage surface into said shuttle sockets, whereby said towers actively raise said roof wing from a closed position to an open position; and wherein said stage enclosure is raised from said lowered position to said raised position.

2. The system according to claim 1, further comprising:

said tower shuttle platform including a top face and a bottom face, wherein said plurality of casters are mounted to said platform bottom face, and said casters being capable of rotating 360 degrees; and said tower shuttle further comprises a connection post including a connection post base, a proximal end, and a distal end, said connection post being vertically mounted to said platform top face, said connection post distal end affixed to said connection post base, and said connection post proximal end including a connection socket.

3. The apparatus of claim 2, further comprising:

wherein said platform includes a bolt hole adapted for receiving a bolt; and wherein said connection post and said connection post base are affixed to said platform via said bolt threaded through a washer and through said platform bolt hole.

4. The apparatus of claim 3, wherein said connection post is comprised of a plastic rod coated in ceramic.

5. The apparatus of claim 4, further comprising:

said connection socket generally comprising a socket joint adapted for receiving a ball joint connection; and wherein said end of a structural tower connected to said transportable, transformable structure includes a ball joint.

6. The apparatus of claim 1, further comprising a plurality of wheels affixed to said transformable structure.

7. The apparatus of claim 6, wherein said plurality of wheels may be removed when said transformable structure is not being transported.

\* \* \* \* \*